United States Patent [19]

Starkey

[11] 4,208,827
[45] Jun. 24, 1980

[54] ADJUSTABLE ANIMAL TRAP

[76] Inventor: Henry L. Starkey, SR Box 90550, Fairbanks, Ak. 99701

[21] Appl. No.: 885,260

[22] Filed: Mar. 10, 1978

[51] Int. Cl.² ............................................. A01M 23/34
[52] U.S. Cl. ........................................................ 43/87
[58] Field of Search ................... 43/86, 87, 15, 78, 79, 43/5; 119/153; 81/177 A

[56] References Cited

U.S. PATENT DOCUMENTS

| 765,818 | 7/1904 | Crago | 43/79 |
| 1,638,252 | 9/1927 | Fitzgerald | 81/177 A |
| 2,168,132 | 9/1939 | Marshall | 43/87 |
| 2,479,196 | 7/1949 | Anderson | 43/87 |
| 3,314,185 | 4/1967 | McCoy | 43/15 |
| 3,949,514 | 4/1976 | Ramsey | 43/87 |
| 3,967,408 | 7/1976 | Aberg | 43/87 |

FOREIGN PATENT DOCUMENTS 891814 3/1962 United Kingdom ........................... 43/5

Primary Examiner—Nicholas P. Godici
Attorney, Agent, or Firm—Snider, Sterne & Saidman

[57] ABSTRACT

A humane animal trap which features an adjustment capability that permits a certain degree of selection of the type of animal which the trap will hold. In a preferred embodiment, the trap includes a snare in the form of a loop. When the trap is triggered, the loop is withdrawn into a housing. The final size of the loop, and hence the degree of pressure exerted by the loop, as well as the size of animal which may be trapped by the loop, may be adjusted by adjusting the degree to which the loop is withdrawn into the housing. The two ends of the snare which form the loop are preferably secured to a spring-loaded piston, whose final resting point in the generally tubular housing, after being sprung, may be adjusted by, for example, a pin secured transversely within the tubular housing in the path of travel of the piston.

11 Claims, 8 Drawing Figures

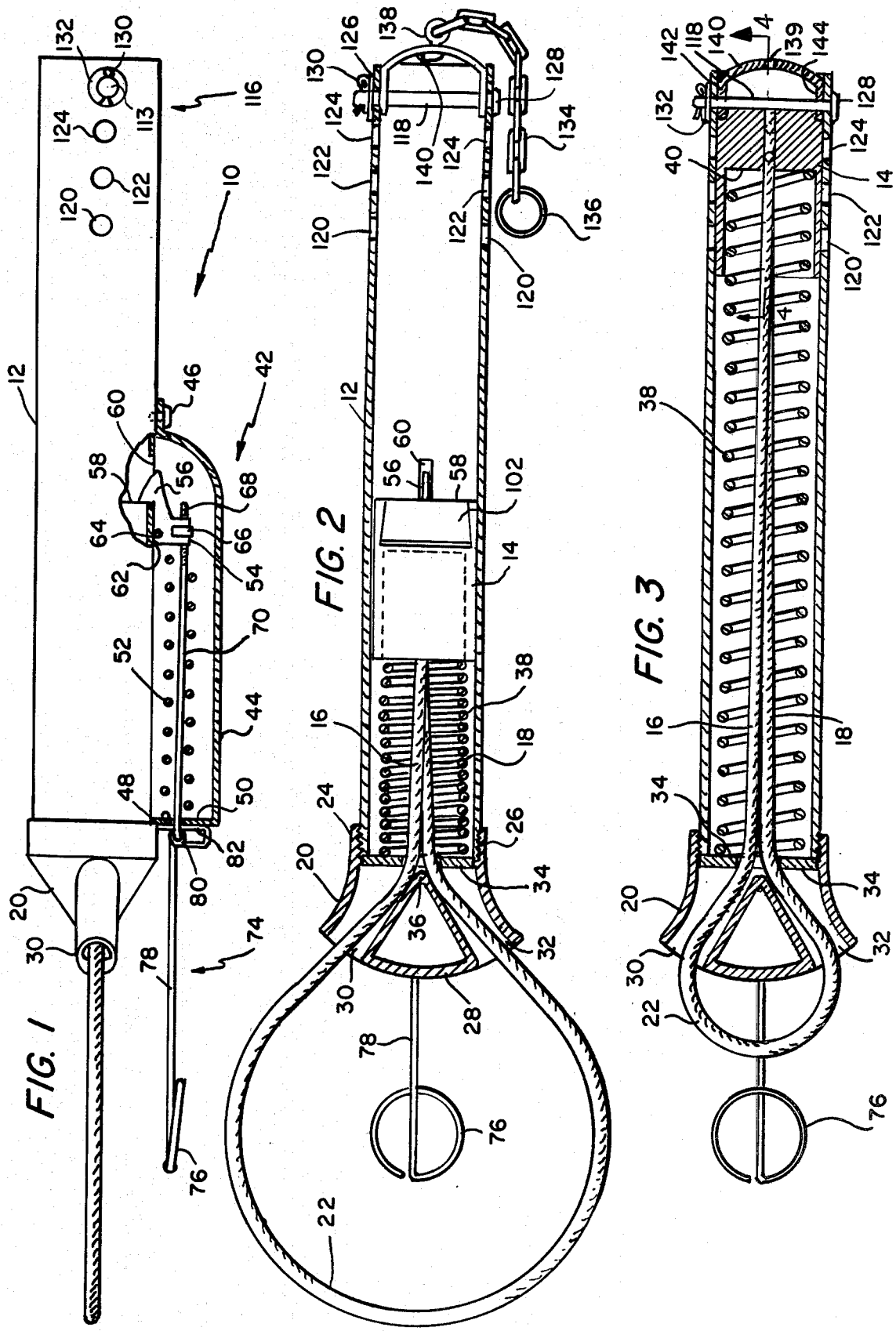

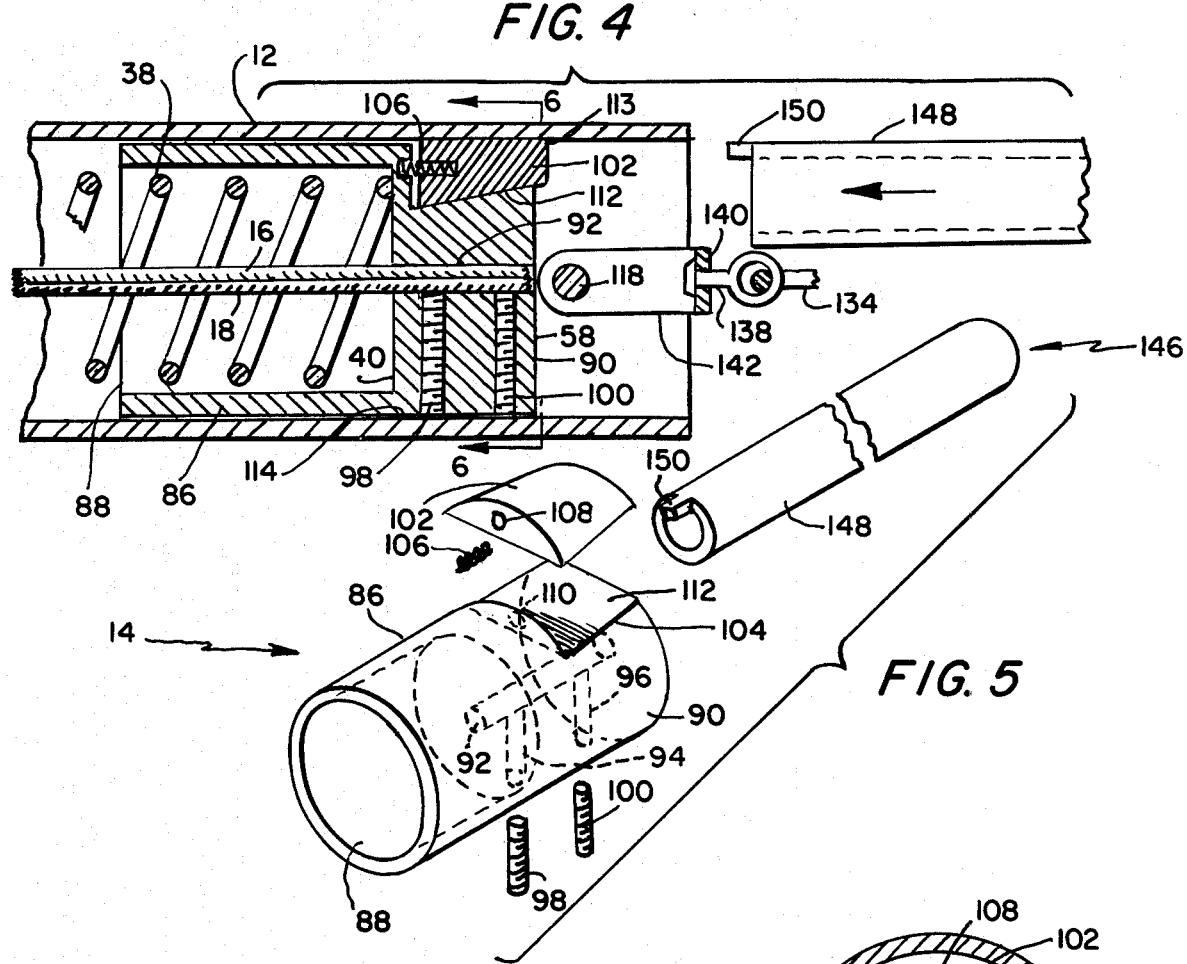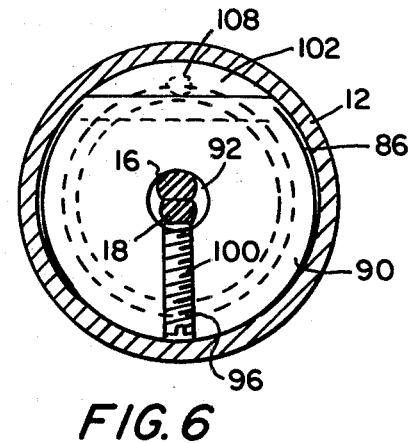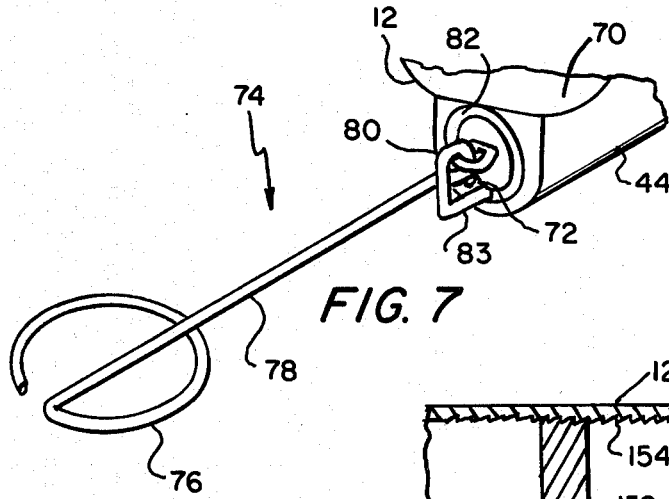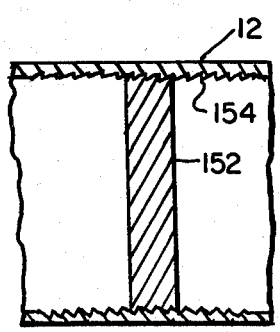

4,208,827

ADJUSTABLE ANIMAL TRAP

BACKGROUND OF THE INVENTION

1. Field of the Invention

This invention is related to animal traps and, more particularly, is directed towards a snare type of animal trap.

2. Description of the Prior Art

Animal traps which utilize a loop type of snare to trap the animal's leg, neck or other body part are known. Prior art U.S. patents of which I am aware which generally describe such traps include: Anderson U.S. Pat. No. 2,479,196; Ramsey U.S. Pat. No. 3,949,514; and Aberg U.S. Pat. No. 3,967,408.

Each of the traps described in the above-cited patents comprises a generally tubular housing which contains a spring-loaded element that is released to travel down the tube when the trap is triggered either by the animal or manually. A loop type of snare, which may comprise a cable, rope, or like element, is connected to the spring-loaded element so as to move therewith. The animal's leg, neck or other body member is trapped in the loop against the housing upon the spring-loaded withdrawal of the former within the latter.

A common deficiency of previously known loop element or snare type of traps, as exemplified by the above-cited patents, is that, while initially designed to alleviate the pain and suffering of the animal caused by the widely utilized jaw type of trap, they have not been as successful in this regard as one might initially expect. This is believed due primarily to the fact that such traps are not adjustable according to the type of animal desired to be trapped. This means that, with a given trap, it has been impossible to discriminate between the force exerted by the snare on a large animal's leg and that exerted on a small animal's leg. For example, it is likely that a snare sized so as to trap a small animal would exert enough pressure on the leg of a large animal to break it, clearly causing the large animal much unneeded pain and suffering. Conversely, a loop type of trap designed to snare a large animal would be incapable of being used to snare a small animal, since the size of loop and pressure exerted by the spring force would have to be changed.

It therefore would be extremely desirable to be able to provide a humane, snare type of animal trap which includes means for permitting same to be adjusted so as to exert only as much pressure as may be required to hold, without hurting, the particular type of another desired to be trapped. It is towards this end that the present invention is advanced.

Full-text copies of the above-cited references are enclosed herewith, and it is respectively requested that they be made of record in the present application.

OBJECTS AND SUMMARY OF THE INVENTION

It is therefore a primary object of the present invention to provide an animal trap of the snare or loop element type which overcomes all of the disadvantages noted above with respect to prior art traps.

Another object of the present invention is to provide a new and improved snare type of animal trap which is more humane than those animal traps previously available.

A further object of the present invention is to provide a new and unique loop element or snare type of animal trap which may be adjusted so as to permit same to humanely trap any size of animal.

An additional object of the present invention is to provide an animal trap of the snare type which may trap an animal by its legs, body or neck, which is inexpensive to manufacture, easy to operate, and may be quickly and easily set with a simple tool.

Another important object of the present invention is to provide a snare type of animal trap which traps animals without harming them so that, if the wrong type of animal is trapped, he may be easily, quickly and safely released.

A still further object of the present invention is to provide a snare type of animal trap which may be adjusted to trap small animals, from fox, lynx, beaver, raccoon, and the like, up to large animals, such as bear, or the like.

A still further object of the present invention is to provide a snare type of animal trap wherein the pressure exerted by the snare on the animal may be adjusted as desired, which includes structure that permits either land or water use, which features a sensitive trigger structure as well as an escape-proof lock.

The foregoing and other objects are attained in accordance with one aspect of the present invention through the provision of an animal trap, which comprises a substantially tubular housing, spring-loaded means movable within the tubular housing between a set position and a release position, and means for snaring an animal which is connected to the spring-loaded means so as to move therewith. The invention includes means for adjusting the released position of the spring-loaded means which, in effect, permits adjustment of the size of the snaring means and/or the degree of pressure exerted thereby on the animal.

In accordance with more specific aspects of the present invention, the means for adjusting the released position of the spring-loaded means comprises means adjustably positionable within the tubular housing for limiting the movement of the spring-loaded means. The movement limiting means generally comprises an abutment member selectively positionable at one of a number of different positions along the tubular housing which corresponds to the desired release position. More particularly, the movement limiting means comprises a stop member adapted to be affixed to any of a plurality of securing means positioned along the tubular housing. In a preferred embodiment, the stop member comprises a rigid pin, while the plurality of securing means comprises a plurality of pairs of opposed and aligned apertures in the tubular housing for receiving the pin transversely to the axis of the tubular housing. Means are preferably mounted to the pin and are adapted to secure the tubular housing to the ground or a suitable support surface.

In accordance with other aspects of the present invention, the spring-loaded means comprises a substantially cylindrical piston and spring means for urging the piston from its set position towards its released position. The piston includes means for securing the means for snaring an animal thereto. The last-named means includes, in a preferred form, cable means having first and second ends, at least one of which is secured by the securing means to the piston. The cable means extends outwardly from one end of the tubular housing to form a loop. The securing means, more particularly, comprises a first aperture axially formed in the piston through which the at least one end of the cable means is positioned. A second aperture is positioned transversely to the first aperture so as to communicate therewith and is adapted to receive a threaded member, such as a set screw, for securing the end of the cable in the first aperture. In a preferred form, both the first and second ends of the cable means are positioned through said secured in the first aperture.

In accordance with another aspect of the present invention, means are provided for retaining the piston in its released position to prevent escape of an animal once trapped. The retaining means comprises keeper means positioned on the edge of the piston which mates with an inclined surface on the piston, and spring means for urging the keeper means upwardly along the inclined surface. More particularly, the keeper means comprises a section of the piston and includes an outer cylindrical surface, a lower inclined surface for abutting the inclined surface on the piston, and a vertical wall between the lower inclined surface and the outer cylindrical surface, the spring means being partially housed in a recess formed in the vertical wall.

In accordance with another aspect of the present invention, trigger means are provided for retaining the piston in its set position until actuated by an animal. The trigger means comprises latch means which are pivotally mounted to the tubular housing and which includes a dog extended through an opening in the housing to engage the piston. Spring-biased means urge the dog into engagement with the piston in opposition to the force exerted by the spring means. More specifically, the trigger means further comprises a trigger housing having an aperture therein formed by a flange, a trigger release rod connected to the latch means and extending through the aperture, the spring-biased means being positioned about the rod and engaged between the latch means and the flange in its set position, and a trip rod coupled to the release rod and adapted, when contacted by an animal, to cause the spring-biased means to come out of engagement with the flange and thereby release the piston. More specifically, the trip rod includes a first loop which is coupled to loop means formed on one end of the trigger release rod, a second loop through which the trigger release rod extends, and a rigid coupling which connects the first and second loops.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a side view, partly broken and partly sectional, of a preferred embodiment of the adjustable animal trap of the present invention;

FIG. 2 is a part longitudinal sectional view of the preferred embodiment illustrated in FIG. 1 showing the trap in its set position;

FIG. 3 is a sectional view similar to that shown in FIG. 2 but with the trap in its released position;

FIG. 4 is an enlarged sectional view of the piston assembly and associated structure from FIG. 3 and taken along line 4—4 thereof;

FIG. 5 is an exploded, perspective view of the piston assembly, associated structure and setting tool which may be utilized in conjunction therewith;

FIG. 6 is a cross-sectional view of the components illustrated in FIG. 4 and taken along line 6—6 thereof;

FIG. 7 is a broken, perspective view illustrating certain of the components which comprise the trigger mechanism of the present invention; and FIG. 8 is a sectional view illustrating an alternative embodiment of the present invention.

DETAILED DESCRIPTION OF THE PREFERRED EMBODIMENT

Referring now to the drawings, wherein like reference numerals indicate identical or corresponding parts throughout the several views, and more particularly to FIGS. 1 and 2 thereof, the adjustable animal trap of the present invention is indicated generally by reference numeral 10.

The trap 10 includes a tubular, generally cylindrical, elongated housing 12. A suitably sized, generally cylindrical piston 14 is movable within housing 12 from a set position illustrated in FIGS. 1 and 2, to a released position illustrated, for example, in FIG. 3. While the set position of the piston 14 is fixed by means of the trigger mechanism indicated generally by reference numeral 42, the release position thereof may be adjustable, as will be described in greater detail hereinafter.

A loop element or snare 22 is formed of rope, cable, or the like, and terminates in two ends 16 and 18 which may be suitably connected to the piston 14 so as to move therewith. The preferred mode of attaching the ends 16 and 18 to piston 14 will be set forth hereinafter.

The two ends 16 and 18 of snare 22 extend through a guide member 20 which is positioned at one end of the tubular housing. The guide member 20 may, for example, be threaded as at 24 to engage similarly sized threads on the end 26 of tubular housing 12. More particularly, the guide member 20 includes a centrally positioned generally triangular guide 28 which forms a pair of passageways 30 and 32 for separating the cable ends 16 and 18 to ensure formation of any desired size of loop 22. A washer 34 is fixed to end 26 of the tubular housing 12 and includes a centrally formed aperture 36 through which the ends 16 and 18 of the snare pass.

As seen in FIGS. 2 and 3, a high tension spring 38 extends between the washer 34 and a recessed, inner face 40 of the movable piston 14 for urging the latter to the right from its set position illustrated in FIG. 2 to its released position illustrated in FIG. 3.

Referring back to FIG. 1, the trigger mechanism 42 is adapted to hold the piston 14 in its set position (FIGS. 1 and 2) until triggered by an animal. The trigger mechanism 42 includes an outer semi-tubular trigger housing 44 which may be fastened to the housing 12 via a screw 46. The other end of trigger housing 44 includes a flange 48 which defines an opening or aperture 50. A trigger set spring 52 extends between flange 48 and a trigger latch 54. Trigger latch 54 includes a dog 56 that engages the outer end surface 58 of piston 14 by extending through an opening 60 formed in the side wall of tubular housing 12.

The trigger latch 54 is pivotally mounted to a flange 62 on the outer surface of tubular housing 12 via a pivot pin 64. Latch 54 preferably includes a nut 66 for adjustably engaging threads 68 formed at one end of a trigger release rod 70 which is positioned within trigger set spring 52. The other end of the trigger release rod 70 has a loop 72 (see FIG. 7) which is coupled to a trip rod which is indicated generally by reference numeral 74.

As illustrated most clearly in FIG. 7, the trip rod 74 includes a loop end 76 which is placed adjacent to the ground or support surface upon which the trap rests. Trip rod 74 also includes a body portion 78 extending from the looped end 76 and a loop 80 for engagement by the loop 72 of trigger release rod 70. A rigid connecting element 83 links loop 80 with a second loop 82 that is oriented in a plane which is perpendicular to that of loop 80 and, more particularly, which is perpendicular to the axis of trigger release rod 70 about which the loop 82 extends. This construction, as will be described in greater detail hereinafter, ensures release of the trigger latch 54 upon actuation of looped end 76 by an animal.

The movable piston 14 of the present invention will be described in greater detail with reference to FIGS. 4 and 5. The piston 14 comprises a generally cylindrical body 86 with a large opening 88 at one end thereof for defining the recessed inner face 40 against which spring 38 acts. The other end 90 of the cylindrical body 86 has an elongated aperture 92 axially formed therein for receiving one or preferably both ends 16 and 18 of the snare 22.

Formed perpendicularly to the aperture 92 are a pair of preferably tapped bores 94 and 96 for receiving recessed set screws 98 and 100, respectively, for tightening against the ends 16 and 18 of the snare to hold same in place within aperture 92.

On the side of the end 90 of the cylindrical body 86 opposite to that upon which is formed the bores 94 and 96 is mounted an escape-proof mechanism in the form of a slide lock keeper 102. Keeper 102 is preferbly formed of a section of the cylindrical end 90 for easy manufacture thereof and to ensure proper operation. The keeper 102 therefore fits well within the cut out 104 on the end 90 of cylindrical body 86. A pair of axially aligned bores 108 and 110 are formed respectively in keeper 102 and end 90 for receiving a small spring 106 which urges the keeper 102 to the right as viewed in FIG. 4. Note that the bottom surface 112 of the cut out portion 104 of piston 14 is inclined so that the corresponding surface 113 of the keeper 102 is forced by spring 106 against surface 112 to, in turn, urge the other cylindrical surface of keeper 102 against the inner cylindrical surface of the tubular housing 12.

Referring back to FIGS. 1 through 3, means for adjusting the final size of the tripped snare 22 and, hence, the force of the spring 38 exerted on the snare, is indicated generally by reference numeral 116. The adjusting means 116 generally comprises an abutment or stop member which is placed at a selected location within the tubular housing 12 so as to limit the movement of the piston 14 and, hence, define the final, released position thereof.

In a preferred form, the adjusting means 116 comprises a rigid pin 118 which is pre-positioned through a selected one of a plurality of pairs of opposed and aligned apertures, such as aperture pairs 120, 122, 124 and 126. As illustrated in FIGS. 2 and 3, pin 118 is positioned through the rearward most pair of apertures 126 so as to define a relatively small size final loop or snare 22. Clearly, if a larger final loop size were designed, pin 118 would be inserted through aperture pairs 124, 122 or 120. Greater or fewer aperture pairs could obviously be provided, as desired.

The selection of the particular aperture pair through which pin 118 would be placed would depend upon the size of the animal desired to be trapped, as well as the force desired to be exerted upon the animal. For example, even with a medium sized animal, it may be desirable to utilize the adjustment position illustrated in FIG. 3, in order to exert the maximum force available, thereby breaking the animal's neck and sparing him of possible pain.

On the other hand, if it is desired to trap a relatively large animal, such as a bear, pin 118 could be placed in the left-most aperture pair 120 so that the smaller animals could not possibly be trapped or held and so that undue force would not be exerted on the bear when trapped.

The pin 118 preferably includes a head 128 and is held within the selected aperture pair by, for example, a cotter pin 130 and a washer 132. Connected to pin 118 is a chain 134 which is terminated at one end by a ring 136 for staking the trap 10 to the ground or support structure. The other end of chain 134 terminates in a pin 138 which is pivotally mounted in an aperture 139 of substantially flat iron yoke 140. The yoke 140 includes apertures 142 and 144 formed on each end flange thereof for receiving pin 118 therethrough.

Clearly, the stop or abutment member 118 could take any of a number of different forms within the spirit and scope of the present invention. For example, as shown in FIG. 8, the stop member could be comprised of a cylindrical disc or slug 152 which is threaded on its outer curved surface. The interior or the tubular housing 12 could also be threaded as at 154 so that the position of the threaded disc 152 could be infinitely adjusted along the tubular housing 12 as desired. Other constructions will also suggest themselves to a person of ordinary skill in the art.

Indicated generally by reference numeral 146 in FIG. 5 is a trap setting tool which may take the form of a cylindrical pipe 148 sized to fit within the opening between pin 118 and the side of tubular housing 112, as illustrated clearly in FIG. 4. The pipe 148 preferably has formed a projection 150 at one end thereof for engaging the outer face of keeper 102 to release same after the trap has been sprung. The tool 146 is then placed against the outer face 58 of piston 14 to urge same down to the position illustrated in FIGS. 1 and 2 where it may be set by engaging the trigger latch 54 with piston 14 by manipulating trigger release rod 70.

In operation, initially the trap may be adjusted to provide substantially any desired size of final loop or loop pressure by selecting the desired pair of apertures through which pin 118 may be secured. After pin 118 has been secured in the desired setting, the trap setting tool 146 is utilized as explained above to urge the piston 14 to the left, as viewed in FIG. 3, until it reaches the position illustrated in FIGS. 1 and 2 at which time the dog 56 may be manipulated over the end surface 58 of piston 14 by means of the trigger release rod 70. The spring 52 of the trigger mechanism 42 is manually set against the flange 48 of the housing 44 to set the trap, which has been suitably staked and positioned.

As may be appreciated from FIG. 7, an animal stepping upon loop 76 or body 78 of trigger 74 will urge loop 80 downwardly. This, in turn, will draw loop 72 of trigger release rod 70 downwardly. The downward movement of rod 70 will bring with it the surrounding spring 52 so as to bring one end thereof out of engagement with flange 48. When spring 52 is released through aperture 50, the force from piston spring 38 against piston 14 is sufficient to pivot the trigger latch 54 about pin 64 so as to bring dog 56 out of engagement with the end 58 of piston 14.

The piston 14 will then travel quickly from its set position illustated in FIGS. 1 and 2 to its released position, defined by the position of pin 118 in its path of travel, as illustrated in FIG. 3. During this rapid movement to the right, the force of spring 38 overcomes that of spring 106, FIG. 4 so that keeper 102 slides leftward and downward on surface 112 of the piston bringing the cylindrical surface 113 of the keeper away from the inner surface of tube 12, so that no frictional resistance is offered by keeper 102 to springing or release of the trap. The snare 22 will quickly close about the animal, thereby trapping same against the guide member 20. After the animal is trapped, the spring 106 of the piston 14 will urge the keeper 102 to the right as illustrated in FIG. 4 so that the inclined face 112 raises the keeper to engage its cylindrical face 113 against tube 12 and the keeper interposes ever increasing frictional force against any movement of the piston toward the left. Thus the wedging action of keeper 102 against the inner surface of the tube will prevent the piston from being pulled by the animal from its released position. Use of the setting tool 146, or like device, will release the piston 14 by moving keeper 102 to the left as viewed in FIG. 4. The projection 150 initially engages keeper 102 moving it to the left against the force of spring 106, and freeing the keeper surface 13 from frictional engagement with the tube. The tool 146 then easily moves the piston leftward to its setting position, overcoming the force of spring 38.

It may be appreciated by virtue of the foregoing that I have provided an improved animal trap which features an adjustable snare which permits the application of any desired holding force to trap any type or size of animal. The substantially hollow piston of the present invention permits water use, as well as land use. The trap is inexpensive, easy to set, includes an escape-proof slide lock device, and provides a sensitive trigger mechanism which will release the trap when disturbed from substantially any direction. For example, referring back to FIG. 7, if the animal should strike either members 76 or 78 laterally instead of vertically, the loop 82 will strike the trigger release rod 70 to release the trigger.

Obviously, numerous modifications and variations of the present invention are possible in light of the above teachings. It is therefore to be understood that within the scope of the appended claims, the invention may be practiced otherwise than as specifically described herein.

I claim as my invention:

1. An animal trap, comprising a substantially tubular, elongated housing, spring loaded means movable longitudinally within said tubular housing between a set position and a released position defined by a stop member, and loop means for snaring an animal connected at least at one of its ends to said spring-loaded means so as to move therewith, said stop member having means for adjusting its position longitudinally within said housing for varying said released position of said spring-loaded means and the resulting size of the loop means protruding from the housing in said released position, wherein said spring-loaded means comprises a substantially cylindrical piston and spring means for urging said piston from said set position towards said released position, wherein said piston includes means for securing said loop means for snaring an animal thereto, wherein said loop means for snaring an animal comprises cable means having first and second ends at least one of which is secured by said securing means to said piston, said cable means extending outwardly from one end of said tubular housing to form a loop, wherein said securing means comprises a first aperture axially formed in said piston through which both said first and second ends of said cable means are positioned, and second and third apertures positioned transversely to and communicating with said first aperture, each of said second and third apertures receiving a threaded member for securing said cable ends.

2. An animal trap as set forth in claim 1, wherein said means for adjusting the position of the stop member comprises means for affixing the stop member to the housing in any of a plurality of locations positioned along said housing and each of which corresponds to a desired released position of the spring-loaded means.

3. The animal trap as set forth in claim 1, wherein said stop member comprises a rigid pin, and said means for affixing the stop member comprises a plurality of pairs of opposed and aligned apertures in said tubular housing for receiving said pin transversely to the axis of said tubular housing.

4. The animal trap as set forth in claim 1, further comprising keeper means for retaining said piston in its released position.

5. The animal trap as set forth in claim 1, further comprising trigger means for retaining said piston in said set position until triggered by an animal.

6. The animal trap as set forth in claim 5, wherein said trigger means comprises latch means pivotally mounted to said tubular housing and including a dog extending through an opening in said housing to engage said piston, and spring-biased means for urging said dog into engagement with said piston in opposition to the force exerted by said spring means.

7. The animal trap as set forth in claim 2, wherein said stop member is a disc threaded on its periphery and mates with threads formed on the inner surface of said tubular housing.

8. An animal trap, comprising a substantially tubular, elongated housing, spring loaded means movable longitudinally within said tubular housing between a set position and a released position defined by a stop member, and loop means for snaring an animal connected at least at one of its ends to said spring-loaded means so as to move therewith, said stop member having means for adjusting its position longitudinally within the housing for varying said released position of said spring-loaded means and the resulting size of the loop means protruding from the housing in said released position, wherein said spring-loaded means comprises a substantially cylindrical piston and spring means for urging said piston from said set position towards said released position, further comprising keeper means for retaining said piston in its released position, wherein said keeper means comprises a keeper positioned on the edge of said piston and mating with an inclined surface on said piston, and spring means for urging said keeper upwardly along said inclined surface.

9. The animal trap as set forth in claim 8, wherein said keeper comprises a section of said piston and includes an outer cylindrical surface, a lower inclined surface for abutting said inclined surface on said piston, and a vertical wall between said lower inclined surface and said outer cylindrical surface, said spring means being partially housed in a recess formed in said vertical wall.

10. An animal trap, comprising a substantially tubular, elongated housing, spring loaded means movable longitudinally within said tubular housing between a set position and a released position defined by a stop member, and loop means for snaring an animal connected at least at one of its ends to said spring-loaded means so as to move therewith, said stop member having means for adjusting its position longitudinally within the housing for varying said released position of said spring-loaded means and the resulting size of the loop means protruding from the housing in said released position, wherein said spring-loaded means comprises a substantially cylindrical piston and spring means for urging said piston from said set position towards said released position, further comprising trigger means for retaining said piston in said set postion until triggered by an animal, wherein said trigger means comprises latch means pivotally mounted to said tubular housing and including a dog extending through an opening in said housing to engage said piston, and spring-biased means for urging said dog into engagement with said piston in opposition to the force exerted by said spring means, wherein said trigger means further comprises a trigger housing having an aperture therein formed by a flange, a trigger release rod connected to said latch means and extending through said aperture, said spring-biased means being positioned about said rod and engaged between said latch means and said flange in its set position, and a trip rod coupled to said release rod and adapted, when contacted by an animal, to cause said spring-biased means to come out of engagement with said flange.

11. The animal trap as set forth in claim 10, wherein said trip rod includes a first loop coupled to loop means formed on an end of said trigger release rod, a second loop through which said trigger release rod extends, and rigid means connecting said first and second loops.

* * * * *